United States Patent [19]

Marean

[11] 3,786,832

[45] Jan. 22, 1974

[54] SOLAR EVAPORATION CONTROLLED IRRIGATION SYSTEM

[76] Inventor: Dale F. Marean, 1626 First St., Manhattan Beach, Calif. 90266

[22] Filed: May 18, 1972

[21] Appl. No.: 254,746

[52] U.S. Cl. .............................................. 137/403
[51] Int. Cl. ......................................... E02b 13/00
[58] Field of Search.......... 137/386, 389, 391, 396 400–403, 137/404, 406, 408, 558

[56] References Cited
UNITED STATES PATENTS

| | | | |
|---|---|---|---|
| 3,485,263 | 12/1969 | Laux | 137/408 |
| 2,004,194 | 6/1935 | Lacy-Mulhall | 137/404 |
| 3,078,866 | 2/1963 | Crow | 137/411 |
| 3,517,684 | 6/1970 | Mitchell | 137/408 X |
| 3,648,721 | 3/1972 | Skappel | 137/408 |

Primary Examiner—Martin P. Schwadron
Assistant Examiner—David R. Matthews
Attorney, Agent, or Firm—William C. Babcock

[57] ABSTRACT

A water supply line in a land irrigation system has a normally closed valve included as a part thereof, with the valve when in an open position permitting water to discharge through a pilot line as well as the supply line. A pivotally and eccentrically supported evaporator pan is provided that may receive both rain and water from the pilot line. Adjustable resilient means at all times urge the pan to a first position. Control means to operatively associate the pan and valve that the valve is in an open position when the pan is in a first position.

However, when the pan is filled with water, either from the pilot line or by rain, to the extent that the weight of water pivots the pan to a second position, the valve is closed to terminate the irrigation operation. When solar evaporation of water from the pan has depleted the weight of the water to the extent that the resilient means can pivot the pan to the first position, the valve is opened to initiate an irrigation operation. The rate of solar evaporation from the pan and the rate of evaporation of water from the land are so related to one another that the pan pivots to the first position when the land requires irrigation.

4 Claims, 2 Drawing Figures

PATENTED JAN 22 1974          3,786,832

SOLAR EVAPORATION CONTROLLED IRRIGATION SYSTEM

BACKGROUND OF THE INVENTION

1. Field of the Invention:

Solar evaporation controlled irrigation system.

DESCRIPTION OF THE PRIOR ART:

In the past, the automatic control of a land irrigation system has posed a serious problem. Automatic timer means have proven to be unsatisfactory for this purpose, inasmuch as such means do not take into consideration precipitation of moisture by rain or other means, and as a result fields are irrigated at timed intervals irrespective of the moisture content of the soil.

The primary purpose in devising the present invention is to supply a control for a land irrigation system that is actuated in relation to the rate of solar evaporation of water from a pivotally and eccentrically supported evaporator pan, with wht pan pivoting to a position to initiate the irrigation operation only when water has evaporated therefrom to a predetermined extent. The rate of evaporation of water from the pan and the rate of evaporation of water from the land are so related that the pan only moves to initiate the irrigation operation when the land actually requires water.

Another object of the invention is to supply a control for a land irrigation system in which the periods of time between irrigation operations is variable, and the time interval of each of these periods being dependent upon whether the land is subjected to rainfall, as well as the rate at which water evaporates from the land from day to day.

SUMMARY OF THE INVENTION

In a first form of the invention a water supply line for the irrigation of land has a normally closed, spring-loaded, solenoid-operated valve included as part thereof, with the valve when in an open position permitting water to discharge therethrough as well as outwardly through a pilot line. A pivotally and eccentrically supported evaporator pan is provided that has a tubular member extending outwardly therefrom that receives water from the pilot line.

Manually adjustable resilient means are provided that at all times urge the pan and tubular member to pivot to a first position where an electric circuit is completed to the solenoid valve to open the same to institute an irrigation operation, with water flowing through the pilot line to the tubular member as the irrigation operation proceeds. When water has risen in the evaporator pan to the extent that the weight of the water pivots the evaporator pan and tubular member to a second position, the electric circuit to the solenoid-operated valve is broken and the valve closes. The valve will be opened only when the electric circuit is again completed, and this completion of the circuit occurs only after water has, by solar evaporation, been removed from the pan to the extent that the resilient means may pivot the pan and tubular member to the first position. Thus, irrigation operations are conducted intermittently, with the length of time between the operations being dependent upon the weight of water in the evaporator pan, the rate at which it evaporates therefrom, as well as whether there is rainfall between the irrigation operations which adds to the weight of water in the pan.

A second form of the invention is also described and claimed in which in irrigation supply line has a normally closed valve included as a part thereof, with the opening of the valve being dependent on the water pressure in a pilot line that extends therefrom. An eccentrically and pivotally supported evaporator pan is provided that has a valve member operatively associated therewith, and the pan at all times being urged by a manually adjustable resilient means to occupy a first position where the valve member does not obstruct flow of water through the pilot line.

When water has discharged through the pilot line and at least partially diverted as a spray into the pan, the valve will remain in the open position until the weight of water in the pan is sufficient to pivot the pan to a second position where the valve member engages the open end of the pilot line to prevent flow of water therefrom. The obstruction of the open end of the pilot line causes the pressure of water therein to rise, and this increased pressure of water in the pilot line causes the valve to assume a closed position to terminate the irrigation operation. After water has evaporated from the pan to the extent that the resilient means may pivot the pan to the first position, water may discharge from the pilot line to cause the valve to open and initiate an irrigation operation that will continue until water has been discharged in the pan to the extent it overcomes the force of the resilient means, and the pan pivots to the second position.

DESCRIPTION OF THE PREFERRED EMBODIMENTS

Figure 1:
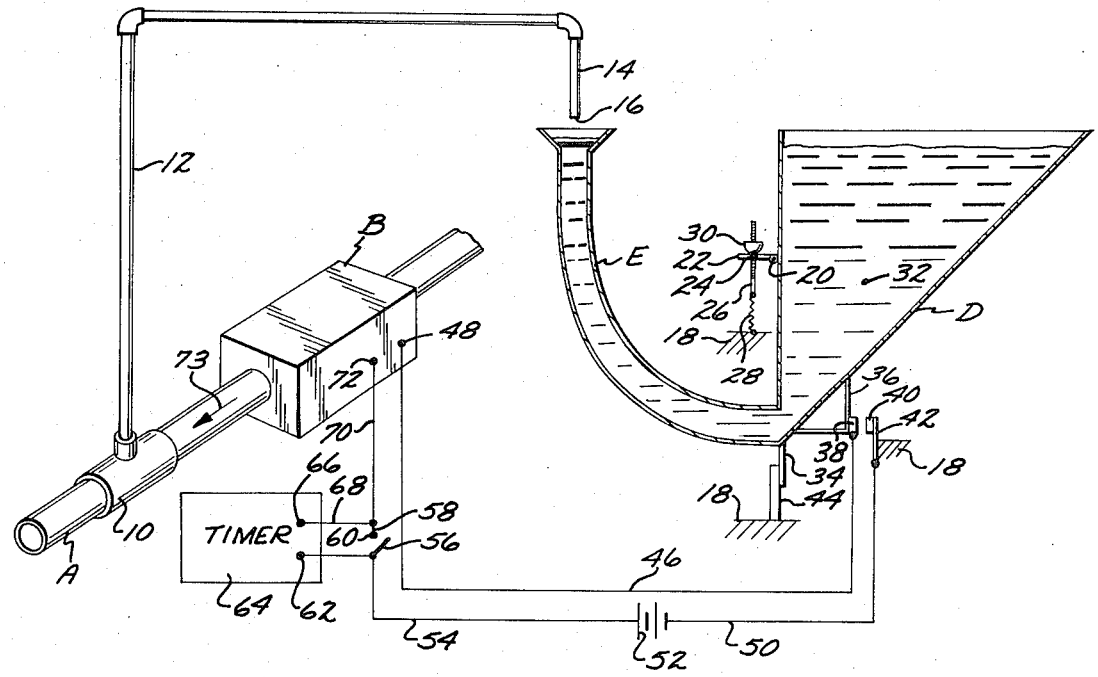
FIG. 1 is a diagrammatic view of a first form of a solar evaporation controlled irrigation system.

The first form of the invention, as may be seen in FIG. 1, includes a water supply line A for irrigation of the land (not shown), which line includes a normally closed, spring-operated solenoid valve B of conventional design. The line A includes a tee 10 from which a pilot line 12 extends upwardly to terminate in a downwardly extending portion 14 that has a first open end 16. A rigid frame structure 18 is provided, but only a portion of which is shown, that occupies a fixed position relative to the valve B.

An evaporator pan D is provided that is preferably of triangular vertical cross section and has a curved, upwardly extending tubular member E projecting therefrom, with the upper end of the tubular member E being vertically aligned with the pilot line portion 14, and the lower end of the tubular member in communication with the interior of the pan D. The evaporator pan D is pivotally and eccentrically supported by a transverse pin 20, which pin has the ends thereof secured to the frame 18. A lug 22 extends outwardly from the pan D. Lug 22 has an opening 24 formed therein through which a threaded rod 26 extends downwardly, with the lower end of the rod being secured by a tensioned spring 28 to the frame 18.

The portion of the threaded rod 26 above the lug 22 is engaged by a rotatable, interiorly threaded nut 30. The tensioned spring 28 at all times exerts a force on the pan D and tubular member E in such a direction that the pan and tubular member tend to pivot counterclockwise on the pin 20. When the pan D and tubular member E are filled with water, as shown in FIG. 1, the center of gravity of the pan and tubular member is located at the point 32, and as a result the pan and tubular member tend to pivot clockwise to a second position. A downwardly extending protuberance 34 is secured to the pan D as may be seen in FIG. 1.

The pand D has a first stop 36 projecting downwardly therefrom that includes a first electrical contact 38. A second contact 40 is spaced from the contact 36, as shown in FIG. 1, and includes a part of a second stop assembly 42 that is secured to the frame 18. The first and second electrical contacts 38 and 40 are in pressure engagement due to the action of the tensioned spring 28 when the pan D and tubular member E have no water or only a little water therein. When the contacts 38 and 40 are in pressure engagement, the pan D and tubular member E are in a first position. The protuberance 34 engages a second stop 44 that extends outwardly from the frame 18 when the pan D and tubular member E are filled with water, as shown in FIG. 1. When the pan D and tubular member are so filled the center of gravity 32 of the pan is so located that the weight of water in the pan tends to pivot the pan and tubular member clockwise to bring the protuberance 34 into engagement with the stop 44.

First electrical contact 38 is connected by an electrical conductor 46 to a first terminal 48 on the solenoid-operated valve B. The portion of the conductor 46 adjacent the contact 38 is flexible, to permit the first contact 38 to move and engage the second contact 40. Second contact 40 and the electrical conducting stop 42 are connected to an electrical conductor 50 that extends to a source of electric power 52. The source of electric power 52 is connected by a conductor 54 to the blade 56 of an electric switch 58, with the blade 56 capable of being moved into engagement with a contact 60. The blade 56 is connected to a first terminal 62 of a timer 64. A second terminal 66 of the timer is connected by an electrical conductor 68 to the contact 60, and the contact 60 and conductor 68 being mutually connected to a conductor 70 that extends to a second terminal 72 on the solenoid-operated valve B. The switch 58 will normally have the blade 56 in the closed position.

At the start of the operation of the control device above described, the tensioned spring 28 will pivot the pan D and the tubular member E when they are free of water counterclockwise to a first position where the contact 38 and 40 are in engagement. When the contacts 38 and 40 are so engaged, and the switch 58 is in the closed position, an electric circuit is completed to the soilenoid-operated valve B to open the same. Water flows through the valve in the direction shown by the arrow 73, with water discharging not only through the line A, but also through the pilot line 12 into the tubular member E. Water will continue to flow through the supply line A for irrigation purposes, as well as through the pilot line 12, until the weight of water in the evaporator pan D and tubular member E is sufficient to overcome the force exerted by the tensioned spring 28, with the pan D and tubular member E then pivoting to the second position shown in FIG. 1. The pan D and tubular member E, upon pivoting to the second position, break the electric circuit to the solenoid-operated valve B, and the valve B closes as a result thereof to terminate the irrigation operation.

The irrigation operation will only be initiated by the valve B assuming an open position, and this will occur only when there has been sufficient evaporation of water from the pan D and tubular member E to permit the tensioned spring 28 pivoting the pan D and tubular member E to the first position where the contacts 38 and 40 are in engagement. Upon the contacts 38 and 40 being placed in engagement, the electric circuit is again completed to cause the solenoid-operated valve B to open and the irrigation operation be initiated.

Should it be desired to shorten the period of time of irrigation when the evaporator pan D and tubular member E are in the first position, this may be done by placing the switch 58 in the open position to place the timer 64 in an operative condition relative to the electric circuit. Inasmuch as the device above described is dependent for its operation upon the quantity of water in the pan D and tubular member E, it will be apparent that upon rainfall occurring the pan D and tubular member E will have water added thereto, and the length of time between irrigation operations by flow of water through the supply line A lengthened. The rate of evaporation of water from the pan D and tubular member E is so related relative to the rate of evaporation from the land to be irrigation that as the land requires irrigation the pan D and tubular member E pivot from the second to the first position. This adjustment is achieved by varying the tension of the spring 28 by manipulation of the nut 30, with the adjustment being such that the pan D and tubular member E move to the first position as the land being irrigated requires the latter.

Figure 2:
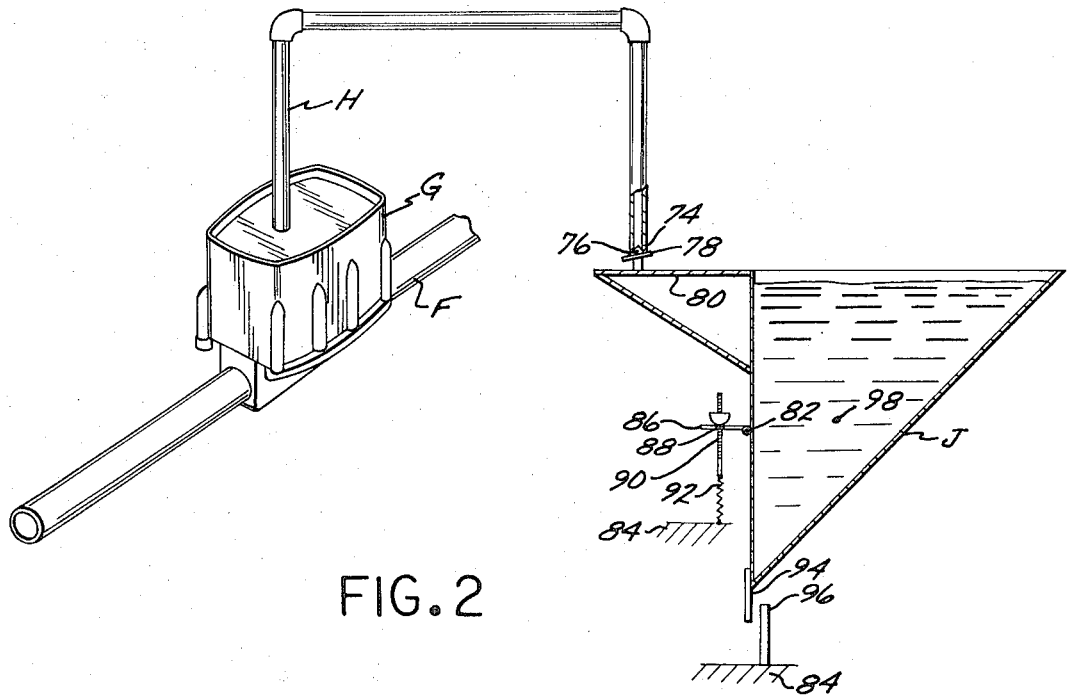
FIG. 2 is a diagrammatic view of a second form of a solar evaporation controlled irrigation system.

A second form of the device to control the flow of water through a supply line F for irrigation purposes is shown in FIG. 2. The line F includes a normally closed valve G that has a pilot line H extending therefrom in the form of an inverted U that has an open first end 74. Water discharges through the pilot line H when the valve G is in the opened condition, but upon the pressure in the pilot line H reaching a predetermined magnitude the valve G is placed in the closed position. The first end 74 of pilot line H is sealed by a valve member 76 that is mounted on a deflector plate 78, which plate in turn is secured to an outwardly extending frame 80 that is secured to one side of an evaporator pan J that is preferably of triangular vertical cross section. The evaporator pan J is pivotally and eccentrically supported in a fixed position relative to the pilot line H by a pin 82. The pin 82 is supported by a rigid framework 84 that is only partially shown in FIG. 2.

A lug 86 extends outwardly from the pan J and has a bore 88 extending transversely therethrough. The bore 88 has a threaded rod 90 projecting downwardly therethrough, with the lower end of the rod being connected to a tensioned spring 92 that extends to the frame 84. The pan J has a protuberance 94 extending downwardly therefrom, and the protuberance 94 is capable of engaging a first stop 96 secured to the frame 84 when the pan J is in a first position. The pan J, when in the first position, moves the valve member 76 out of engagement with the first end 74 of pilot line H, with water then discharging onto the deflector plate 78 and at least a portion of this water being dicharged as spray into the pan J.

When the weight of the water discharged as spray into pan J has reached a sufficient weight as to overcome the force exerted by the spring 92, the pan J will pivot clockwise to a second position where the valve member 76 is placed in pressure sealing contact with the open end 74 of the pilot line H. It will be noted that the center of gravity 98 in the pan J is so located that such clockwise rotation will take place. The pressure of water in the pilot line H now increases to the predetermined magnitude previously mentioned, and as a result the valve G is placed in the closed position to terminate further flow of water for irrigation purposes through the supply line F.

After water is depleted from the evaporator pan J by solar radiation to the extent that the tensioned spring 92 can pivot the pan J to the first position, the valve G will again be opened and the above-described operation will be repeated. The rate of evaporation of water from the pan J and that from the land being irrigated are so related that by the time water has been evaporated from the pan J to the extent that the pan is moved to the first position, the land requires irrigation.

The use and operation of the two forms of the invention have been described previously in detail, and need not be repeated.

I claim:

1. In combination with a land irrigation system that includes a water supply line having a normally closed, springloaded, solenoid-operated valve therein and a pilot line downstream from said valve, a device for automatically and electrically energizing said valve to permit flow of water through said supply line in relation to the water needs of the plants being irrigated, said device including:
    a. an open top evaporator pan exposed to the sun and capable of receiving water both from said pilot line and rain;
    b. a tubular member that extends outwardly and upwardly from said pan and in communication with the interior thereof, said tubular member so disposed as to receive a downwardly directed stream of water from said pilot line;
    c. first means for pivotally and eccentrically supporting said pan and tubular member to permit said pan and tubular member to pivot to either a first or second position;
    d. a first stop that includes a first electrical contact;
    e. a second stop;
    f. second means that occupy a fixed position relative to said pan and tubular member, said second means in abutting contact with said second stop when said pan and tubular member are in said second position;
    g. a second electrical contact that occupies a fixed position relative to said pan and tubular member and is in abutting engagement with said first contact when said pan and tubular member are in said first position;
    h. adjustable resilient means that at all times urge said pan and tubular member to pivot to said first position;
    i. electrical circuit means connected to said first and second electrical contacts and to said solenoid-operated valve;
    j. third means for supplying electric power to said circuit means, said resilient means urging said pan and tubular member to pivot to said first position to close said circuit means and open said solenoid-operated valve, with water thereafter discharging from said pilot line to flow into said pan and tubular member to said second position to break said electrical circuit means, with said pan and tubular member remaining in said second position until sufficient water has been removed from said pan by solar evaporation as to permit said resilient means to picot said pan and tubular means to said first position to complete said circuit means and open said valve to permit irrigation by said system until the water discharged into said tubular member and said pan through said pilot line is sufficient in weight to pivot said pan and tubular member to said second position and break said circuit means to close said solenoid-operated valve.

2. A device as defined in claim 1 in which said pan is of a triangular shape and exposes an upper surface of a body of water therein to solar evaporation, with the rates of evaporation of water from said pan and from said land being irrigated being so related that by the time said land requires irrigation sufficient water will have evaporated from said pan to permit said resilient means to pivot said pan and tubular member from said second to said first position to electrically open said solenoid-operated valve to permit flow of water through said supply line and pilot line until said pan fills with water to the extent that said pan and tubular member pivot to said second position and allow said spring-loaded solenoid-operated valve to close.

3. A device as defined in claim 1 which in addition includes:
    k. timer means operatively associated with said solenoid operated valve for intermittently breaking and completing said circuit when said pan and tubular member are in said first position to open and then close said valve after predetermined lengths of time to permit flow of water through said supply line for predetermined time period to irrigate said land.

4. A device as defined in claim 3 in which said timer is electrically operated.

* * * * *